(12) United States Patent
Banzahf et al.

(10) Patent No.: US 7,757,007 B2
(45) Date of Patent: Jul. 13, 2010

(54) COMPUTER PROGRAM PRODUCT AND SYSTEM FOR MANAGING VIRTUAL INSTANCES OF A PHYSICAL PORT ATTACHED TO A NETWORK

(75) Inventors: Gerhard Banzahf, Nufringen (DE); Stefan Mueller, Holzgerlingen (DE); Jaya Srikrishnan, Wappingers Falls, NY (US); Frank W. Brice, Jr., Hurley, NY (US); Giles R. Frazier, Austin, TX (US); Ingo Adlung, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 12/056,937

(22) Filed: Mar. 27, 2008

(65) Prior Publication Data

US 2008/0181232 A1    Jul. 31, 2008

Related U.S. Application Data

(63) Continuation of application No. 11/479,847, filed on Jun. 30, 2006.

(30) Foreign Application Priority Data

Jul. 1, 2005    (EP) ................................. 050105995

(51) Int. Cl.
*G06F 15/16*    (2006.01)
*G06F 3/00*    (2006.01)
*H04L 12/28*    (2006.01)

(52) U.S. Cl. ......................... 709/250; 710/8; 370/395.3
(58) Field of Classification Search ................. 709/250; 370/395.3; 710/8
See application file for complete search history.

(56) References Cited

U.S. PATENT DOCUMENTS

| 7,103,648 | B1 | 9/2006 | Burrows |
| 2003/0103504 | A1 | 6/2003 | Dugan et al. |
| 2005/0010688 | A1* | 1/2005 | Murakami et al. ........... 709/245 |
| 2006/0036822 | A1* | 2/2006 | Kaji ........................... 711/163 |
| 2008/0215793 | A1* | 9/2008 | Hashimoto et al. ............. 711/6 |

OTHER PUBLICATIONS

PCT/EP2006/060782, Patent Search Report, Mailed on Jan. 17, 2008.

* cited by examiner

*Primary Examiner*—Kevin Bates
*Assistant Examiner*—Mohammed Ahmed
(74) *Attorney, Agent, or Firm*—Cantor Colburn LLP

(57) ABSTRACT

The present invention relates to a method, a computer program product and a system for managing virtual instances of a physical port attached to a network. The method is based on the Fiber Channel N_Port virtualization for a physical Fiber Channel N_Port. Multiple virtual Fiber Channel adapters share a single physical N_Port among multiple operating system instances. The invention discloses means for the automatic and persistent generation and administration of unique Worldwide Port Names needed for the N_Port virtualization.

8 Claims, 5 Drawing Sheets

COMPUTER PROGRAM PRODUCT AND SYSTEM FOR MANAGING VIRTUAL INSTANCES OF A PHYSICAL PORT ATTACHED TO A NETWORK

CROSS-REFERENCE TO RELATED APPLICATIONS

The present application is a continuation of U.S. patent application Ser. No. 11/479,847 filed on Jun. 30, 2006, which claims priority to European Patent Application No. 050105995.4, filed Jan. 7, 2005, and all the benefits accruing therefrom under 35 U.S.C. §119, the contents of which in its entirety are herein incorporated by reference.

BACKGROUND OF THE INVENTION

1. Field of the Invention

The present invention relates to a method, a system, and a computer program product for managing virtual instances of a physical port attached to a network.

2. Background Art

More specifically, the invention relates to a network, in which each connected computer or device has a unique identifier. As an example, a network with Fibre Channel connections is described.

Functionally, the Fibre Channel (FC) is a bi-directional, full-duplex, point-to-point, serial data channel structured for high performance data communication. The FC provides a generalized transport mechanism that has no protocol of its own or a native input/output command set, but can transport any existing Upper Level Protocols (ULPs) such as FCP, the "Fibre Channel Protocol for SCSI (Small Computer System Interface)", and IP, the Internet Protocol.

The smallest, indivisible unit of information transfer used by FC is called a frame. Frames are used for transferring data. The frame size depends on the hardware implementation and is independent of the ULP or the application software. These frames are aggregated to form messages called sequences. The frames of a sequence can be received out of order. One or more sequences form an exchange, which is a basic transaction. The frames are divided in two categories: link control frames without data payloads, which are used for the flow control, and data frames with data payloads such as encapsulated ULP data.

Various FC standards exist, for example the following references:
1. Information Technology—Fibre Channel Protocol for SCSI, $2^{nd}$ Version (FCP-2), ANSI/INCITS 350
2. Information Technology—Fibre Channel Framing and Signalling Interface (FC-FS), ANSI/INCITS 373.

Further details about FC can be found for example in Robert W. Kembel, "The Fibre Channel Consultant—A Comprehensive Introduction", 1998.

Connecting a computer or other device to a FC requires specific hardware. FC hardware is usually provided in the form of FC adapter cards which are plugged in existing input/output (I/O) hardware such as PCI/PCI-X/PCI-Express slots of a computer system. Every FC adapter contains at least one N_Port, a FC hardware entity which performs the actual data communication over the FC link.

An N_Port is identifiable by a unique Worldwide Port Name (WWPN) implemented as a 64-bit value. This WWPN is normally assigned at manufacturing time of the FC hardware, but may also be assigned by other means, provided that the port name can be guaranteed to be unique worldwide. An N_Port can act as an originator or a responder.

FC connections may be implemented as a point-to-point link, or an arbitrated loop or a switching network, called a fabric.

A FC fabric is an interconnection network that allows multiple N_Ports to intercommunicate. The entry/exit ports on a fabric are called F_Ports, and each N_Port has to connect to one F_Port. The fabric allows each connected N_Port to communicate with any other N_Port that is attached to the fabric.

The FC fabric assigns to each attached N_Port an identifier, which is an address by which an N_Port is uniquely known for the fabric. Since the N_Port identifier is a 24-bit value, a FC fabric can support up to 16.7 million N_Ports. The N_Port identifier consists of a Domain (most significant byte), an Area, and a Port, each 1 byte long. The N_Port identifier is used in the Source Identifier (S_ID) and Destination Identifier (D_ID) fields of the header of a FC frame.

Initiating communications in a fabric requires a multistage login process in which communications are first established between an N-port and an F-port in the fabric and then with the destination N-port. In the first step, the fabric login of the N_Port establishes the classes of service to be used within the fabric and other communications parameters including flow control information. After the fabric login of the N_Port completes, the initiating and recipient N-ports in the network establish communications with each other through a second login process called node logic Several communication parameters are exchanged and the transmission starts. As FC can be used to connect systems with multiple types of internal resources and processes within, an additional login called a process login is used. For example, the process login is used to select parameters related to an ULP supported by processes within two communicating N_Ports.

The vast majority of today's FC adapters provide one N_Port only. In a computer executing multiple operating system (OS) instances, the problem occurs how to share such an N_Port among these instances. Such sharing would be advantageous to minimize the number of FC adapters, to reduce cost and to maximize adapter utilization, especially for large scale virtualisation environments. The problem exists even when using FC adapters providing multiple N_Ports since the number of processes needing to be supported often exceeds the number of N_Ports provided by the FC adapters.

The capability to execute multiple OS instances is usually provided by a software layer called (execution) hypervisor that encapsulates the underlying hardware and provides virtual hardware interfaces either for the underlying hardware or for different hardware architectures. For example, a hypervisor can be part of the firmware of a computer system, it can be part of an operating system, or it can be a regular program running as a process within an OS instance. The work of the hypervisor is often supported by additional hardware features, for example special processor instructions or firmware layers.

Some hypervisors can effectively create multiple virtual images of a computer system, giving an OS instance executing in such a virtual computer system almost the illusion as if it was running exclusively on the real server. These OS instances access real I/O entities (like adapters) via I/O ports, which can be defined and assigned to a virtual computer system in a configuration step. An OS instance may only perform I/O operations using I/O ports assigned to the particular virtual server on which it is running.

The U.S. patent applications No. 2003/0200247A1 and No. 2004/0025166A1 describe a method for the concurrent sharing of a FC adapter among multiple OS instances in a computer system. However, this sharing capability has various deficiencies caused by the fact that the same N_Port identifier is used for all FC frames sent from or destined to a particular FC adapter. Consequently, this N_Port identifier cannot be used to distinguish multiple OS instances: All of the frames seem to come from the same initiator, and responses are accordingly sent back to the same address. The solution proposed in the above patent applications is to intercept, analyse, and modify the FC frame traffic between the multiple OS instances and the physical N_Port.

A major disadvantage is that this solution is host-based, which means that the approach needs to be performed on a host computer system that is attached to a FC fabric. Since FC is a technology used mainly for Storage Area Networks (SAN), and the usual method for access control in the SAN and its attached storage devices is managed by the SAN itself (using databases stored in the fabric), this adds additional complexity to the SAN management and administration.

Another disadvantage is that it is not possible to initiate a FC transaction to a particular OS instance from outside of the computer system executing the multiple OS instances. This limitation is caused by the need for the unequivocal response identifier that gets added to the frame header when it gets intercepted. There is only one response identifier to be used for frames that will be sent to a particular OS instance. Without being able to identify the specific OS instance, any incoming frame has to be forwarded to every OS instance. An OS instance needs to decide then if it will accept and process the frame.

Other deficiencies that exist in such a shared adapter environment are related to ULPs such as FCP; for example, SCSI reservations do not work properly, correct SCSI status and sense data handling cannot be guaranteed, SCSI task management functions do not work properly, and vendor-unique SCSI commands might not work at all.

SAN access control for the connected storage controllers of a fabric is typically implemented by methods like zoning and SCSI Logical Unit (LUN) masking. Zoning and LUN masking rely on WWPNs to identify users of controlled assets. Using a LUN and FCP as the ULP, a FC host can address multiple peripheral devices that may share a common controller. Zoning allows partitioning the N_Ports of a fabric into N_Port groups, called zones. The N_Port within a zone can only communicate with other N_Ports in the same zone.

One way to solve the FC adapter sharing problem was disclosed in the U.S. patent application No. 2003/0103504A1 and later on incorporated in the INCITS/ANSI FC Framing and Signalling (FC-FS) standard 1.6, which describes how a fabric needs to handle N_Port identifier virtualisation. The application describes a method to obtain multiple N_Port identifiers (N_Port IDs) for a single physical N_Port.

In order to obtain an N_Port identifier, the N_Port first logs in with the fabric by sending a "Fabric Login" (FLOGI) extended link service (ELS) command (a special link control frame) to the attached F_Port. In this step additional service parameters will be transferred, and the first N_Port identifier is assigned. After FLOGI is complete, the fabric prepares itself to assign additional N_Port identifiers. In order to obtain another N_Port identifier, the N_Port sends a "Fabric Discover" (FDISC) ELS command using an S_ID of zero. The FDISC ELS is used instead of additional FLOGI commands to avoid disruption of the operating environment. When the N_Port sends the FDISC ELS to the fabric, it provides the following functions:

1. It provides the means for the physical N_Port to transfer a WWPN to the fabric.
2. It provides a signal to the fabric to validate and assign an additional N_Port identifier for the physical N_Port, and allows both the fabric and the physical N_Port to begin normal frame reception and transmission using the new N_Port identifier.
3. It provides a signal which causes the fabric to update databases maintained within the fabric.

When the new N_Port ID has been assigned, the physical N_Port can associate the new N_Port ID with a virtual adapter, which is an entity behind the physical N_Port that generates and receives frames using the new N_Port ID on behalf of an OS instance. Therefore, multiple virtual adapters can be associated with a physical adapter and its N_Port, where each virtual adapter uses a unique N_Port ID.

The assignment of new N_Port IDs requires the availability of unique WWPNs and means for the automatic and persistent assignment of these WWPNs to virtual adapters, where persistent can mean surviving e.g. a reboot of an OS instance, a power-off/power-on cycle of the computer system, or a reboot of a FC adapter. In large scale computer centres with complex SAN installations it can become therefore a very complex task to ensure that every WWPN in use is really unique.

SUMMARY OF THE INVENTION

It is therefore an object of the present invention, to provide a method for managing virtual instances of a physical port attached to a network that is improved over the prior art and a corresponding computer system and a computer program product.

This object is achieved by the invention as defined in the accompanying claims 1, 9, 10 and 12.

The present invention proposes a FC adapter virtualisation entity that can be used to provide multiple virtual FC adapters for a single physical FC adapter as a way to share this FC adapter among multiple OS instances. Each virtual adapter has a single N_Port ID. If the physical FC adapter has multiple physical N_Ports, then independent sets of virtual adapters can be associated with each of the N_Ports of that physical adapter.

The FC adapter virtualisation entity obtains a WWPN for each I/O port that is defined in a hypervisor system configuration from a FC virtual adapter name controller entity. This entity may create a WWPN using a scheme or just take it from a pool of WWPNs. It is possible that the WWPN of a physical N_Port of the physical FC adapter is used for a virtual FC adapter. The FC virtual adapter name controller ensures the worldwide uniqueness for a WWPN that it provides.

A virtual FC adapter may be created when an OS instance activates an I/O port, or it maybe created in advance in order to save the time for its initialisation, and be associated to the I/O port when that I/O port is activated. In any case, when the virtual adapter is associated to an I/O port, it uses the WWPN of that I/O port in order to perform a fabric login using the FDISC ELS command and to acquire a corresponding FC N_Port ID. The WWPN remains associated with the virtual adapter as long as the virtual adapter is tied to that particular I/O port.

The association of an I/O port and its WWPN can be made persistent by storing related tables on a storage device coupled to the computer system. This way a power-off/power-on cycle of the computer system or a restart of the hypervisor has no influence to the mapping of a WWPN to an I/O port. The WWPN, through the issuance of FDISC and the assignment of an N_Port ID for the WWPN, ensures that only properly authorized virtual servers and operating system instances can reach their assigned resources.

The present invention allows sharing a single physical FC adapter among multiple OS instances transparently. The adapter is shared automatically without any special commands required by the OS instances.

A further important aspect of the invention is that it supports the regular SAN management and administration models such as zoning and LUN masking transparently. This avoids host-based SAN management and administration steps and the attendant problems previously described. This also reduces the SAN management and administration complexity significantly. This eliminates restrictions for ULPs such as FCP.

Another aspect of the invention is that a FC transaction using a virtual adapter can get initiated from outside of the computer system and directed to a particular OS instance.

The invention allows defining virtual adapter characteristics, for example performance characteristics such as adapter bandwidth. This allows balancing between the virtual adapters that share the same physical N_Port based on the performance needs of each virtual adapter.

BRIEF DESCRIPTION OF THE DRAWINGS

For the present invention, and the advantages thereof, reference is now made to the following descriptions taken in conjunction with the accompanying drawings.

DETAILED DESCRIPTION

Figure 1:
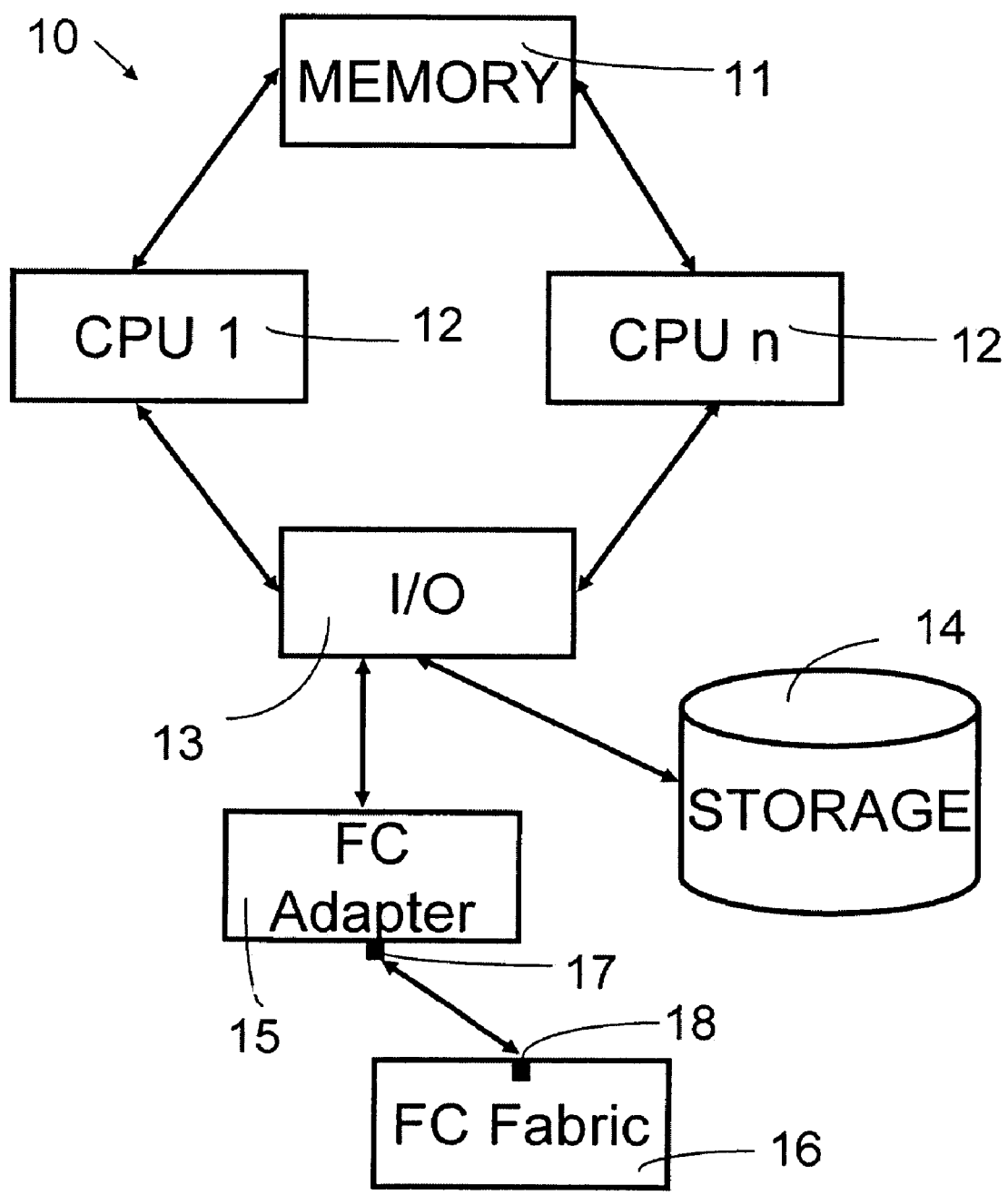
FIG. 1: Is a block diagram of a computer system into which the invention can be implemented.

FIG. 1 illustrates a computer system 10 in which the present invention can be used. A shared memory 11 is coupled to one or more Central Processing Units (CPUs) 12. These CPUs 12 are also coupled to an I/O subsystem 13. A separate storage device 14 can also be accessed by the CPUs 12. The content of the storage device 14 is persistent: It survives a power off/power-on cycle. A FC adapter 15 is accessible for the CPUs 12 via the I/O subsystem 13, and this FC adapter 15 is connected to a FC fabric 16. The FC adapter 15 has a physical N_Port 17 that is connected to an F_Port 18 of the fabric 16.

Figure 2:
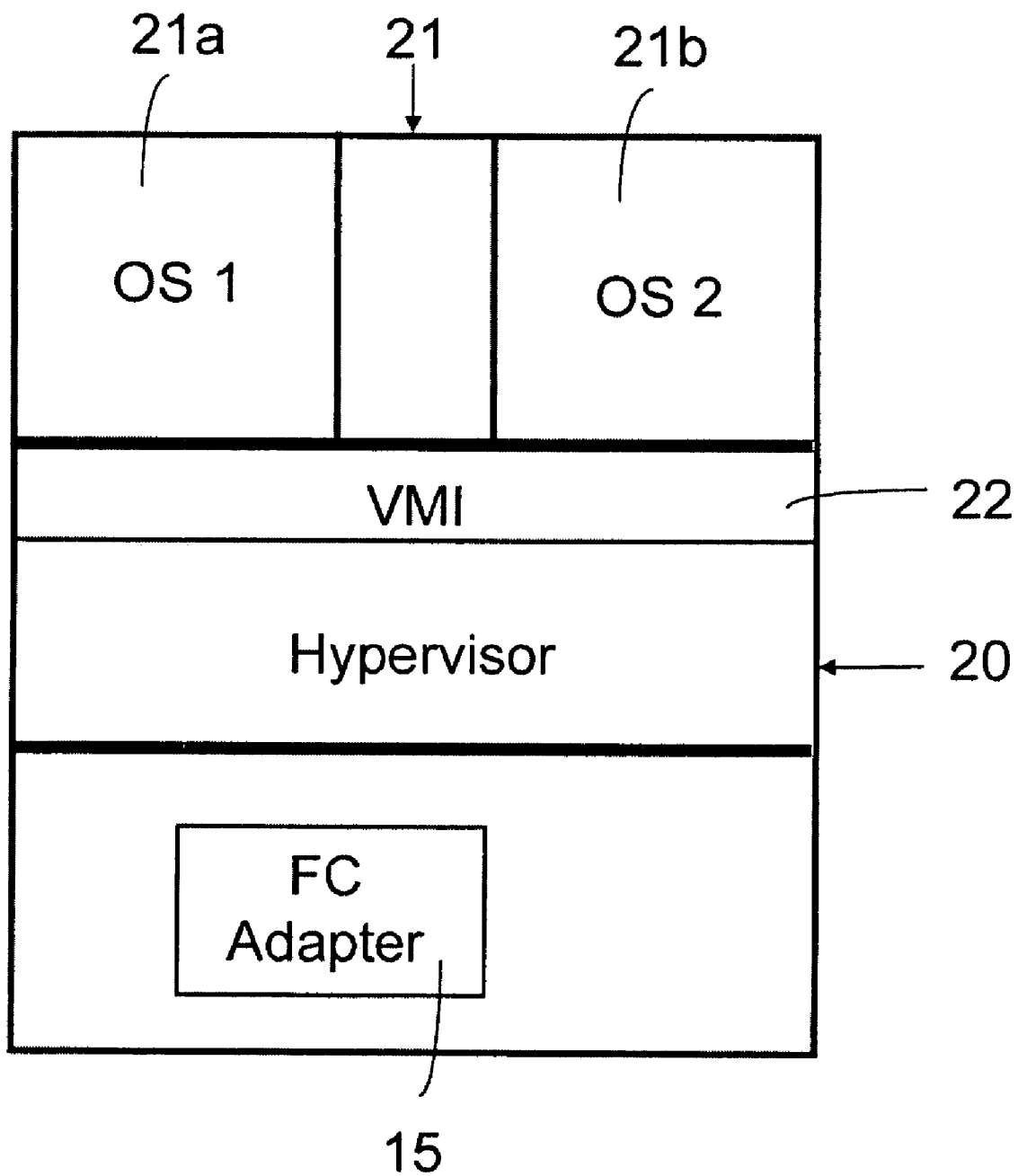
FIG. 2: Is a block diagram of the encapsulation of a FC adapter by a hypervisor that controls multiple OS instances.

As shown in FIG. 2, the computer system is running a hypervisor 20 on the CPUs 12, which controls multiple OS instances 21 that are executed concurrently. The hypervisor 20 emulates the FC adapter 15; the OS instances 21 perceive the normal FC adapter interface, but in fact have I/O requests processed through the hypervisor 20 in order to access the FC adapter 15. The component of the hypervisor that is responsible for the interface to the OS instances 21 is called the virtual machine interface (VMI) 22. The VMI 22 can be any kind of computer interface usable by software. In the preferred embodiment of the invention the storage device 14 is used to store internal data of the hypervisor 20 and not directly accessible by the OS instances 21.

Figure 3:
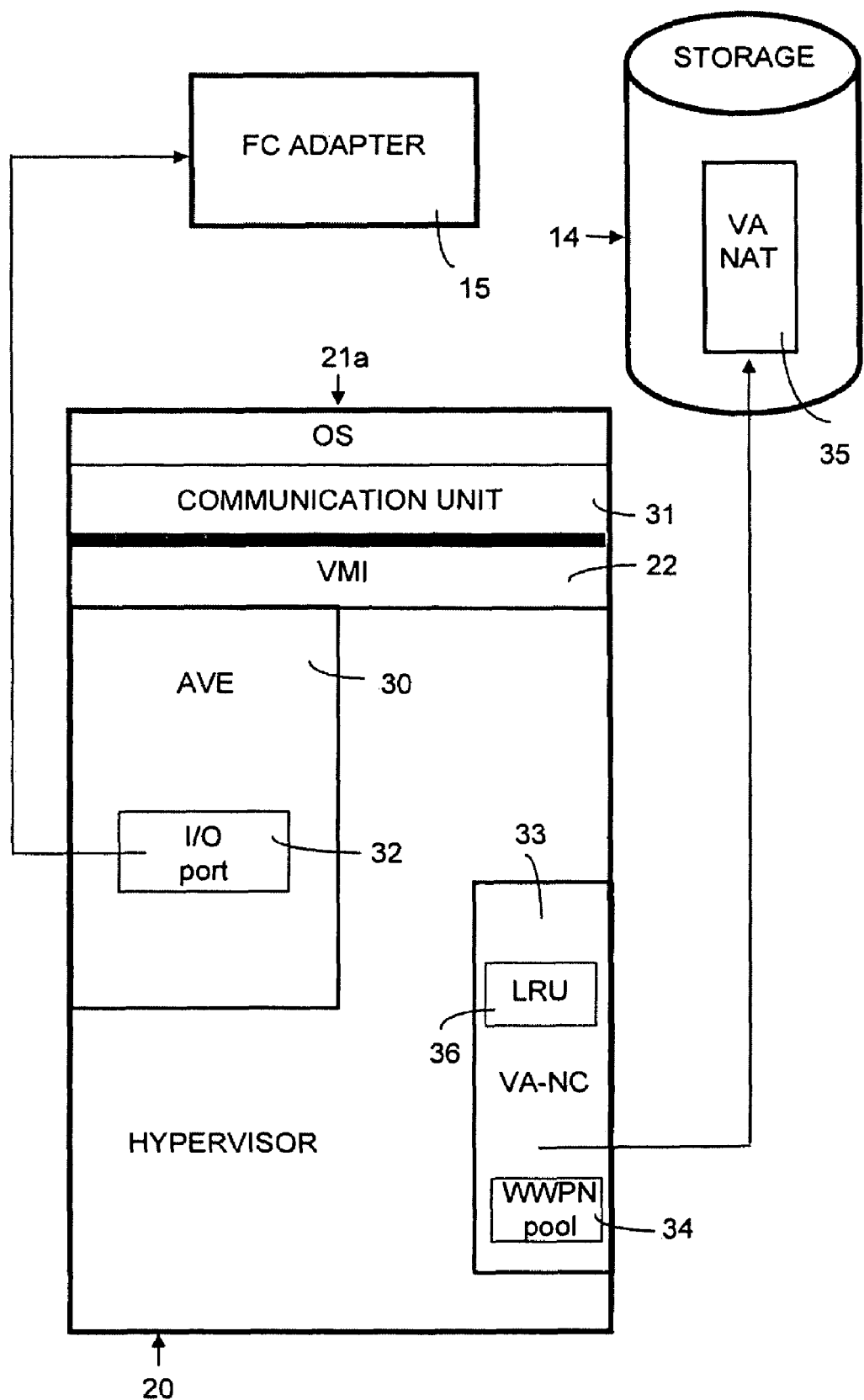
FIG. 3: Is a block diagram of a hypervisor embodiment in accordance with the invention.

A FC Adapter Virtualisation Entity (AVE) 30 is now implemented as a component of the hypervisor 20 shown in FIG. 3. Its purpose is to intercept I/O requests from the OS instances 21 accessing the FC adapter 15. Typically, an OS instance 21a makes I/O requests in a communication unit 31. Such a communication unit 31 can be implemented as a device driver for example.

The communication unit 31 uses an I/O port 32 to communicate with a FC adapter 15. For the purposes of the present invention it is sufficient that the I/O port 32 comprises a request queue and a response queue. These queues will be used by the AVE 30 and the communication unit 31. The communication unit places requests for the FC adapter 15 in the request queue. A request contains addresses of the memory 11 that allow the AVE 30 to access data stored in the memory 11 that can be associated with such a request. This data comprises FC frames that will be forwarded by the AVE 30 to the FC adapter 15. The hypervisor 20 places responses from the FC adapter 15 in the response queue. A response contains addresses of the memory 11 that allow the communication unit to access data stored in the memory 11 by the hypervisor 20. The data in the memory 11 also comprises FC frames that have been received by the FC adapter 15.

In order to use an I/O port 32 it needs to be activated by a communication unit 31 as it would without the present invention. For every activated I/O port 32, the AVE 30 creates special data structures in the memory 11. These data structures are called a virtual FC adapter. Among associated interfaces of the hypervisor 20 are interfaces that allow an OS instance 21a to send and receive FC frames. The special data structures are used for the implementation of these interfaces.

During the I/O port activation, the AVE 30 obtains a new N_Port identifier from the fabric 16 (as described earlier) that is associated with the I/O port 32 and stored in the corresponding virtual adapter. For each frame that is sent from a communication unit 31 using this I/O port 32 the AVE 30 puts the N_Port ID associated with this I/O port 32 in the S_ID field of the FC frame header. Accordingly, all FC frames received by the AVE 30 from the fabric 16 that carry this N_Port ID in the D_ID field of the frame header are forwarded via this I/O port 32 to the corresponding OS instance 21a.

An I/O port 32 is generated by the hypervisor 20 in a special system configuration step. In this step, the AVE 30 uses a Virtual Adapter Name Controller (VA-NC) 33 entity to assign a WWPN to the I/O port 32. The VA-NC 33 maintains a pool 34 of WWPNs, from which it takes one WWPN that is assigned to the I/O port 32 and removed from the pool 34. WWPNs that have been assigned to an I/O port 32 are maintained by the VA-NC 33 in a table 35 called the Virtual Adapter Name Assignment Table (VA-NAT), which is stored on the persistent storage device 14. In the system configuration step the association of an I/O port 32 to an OS instance 21a is also defined. There is no restriction that a communication unit 31 can use one I/O port only.

Figure 4:
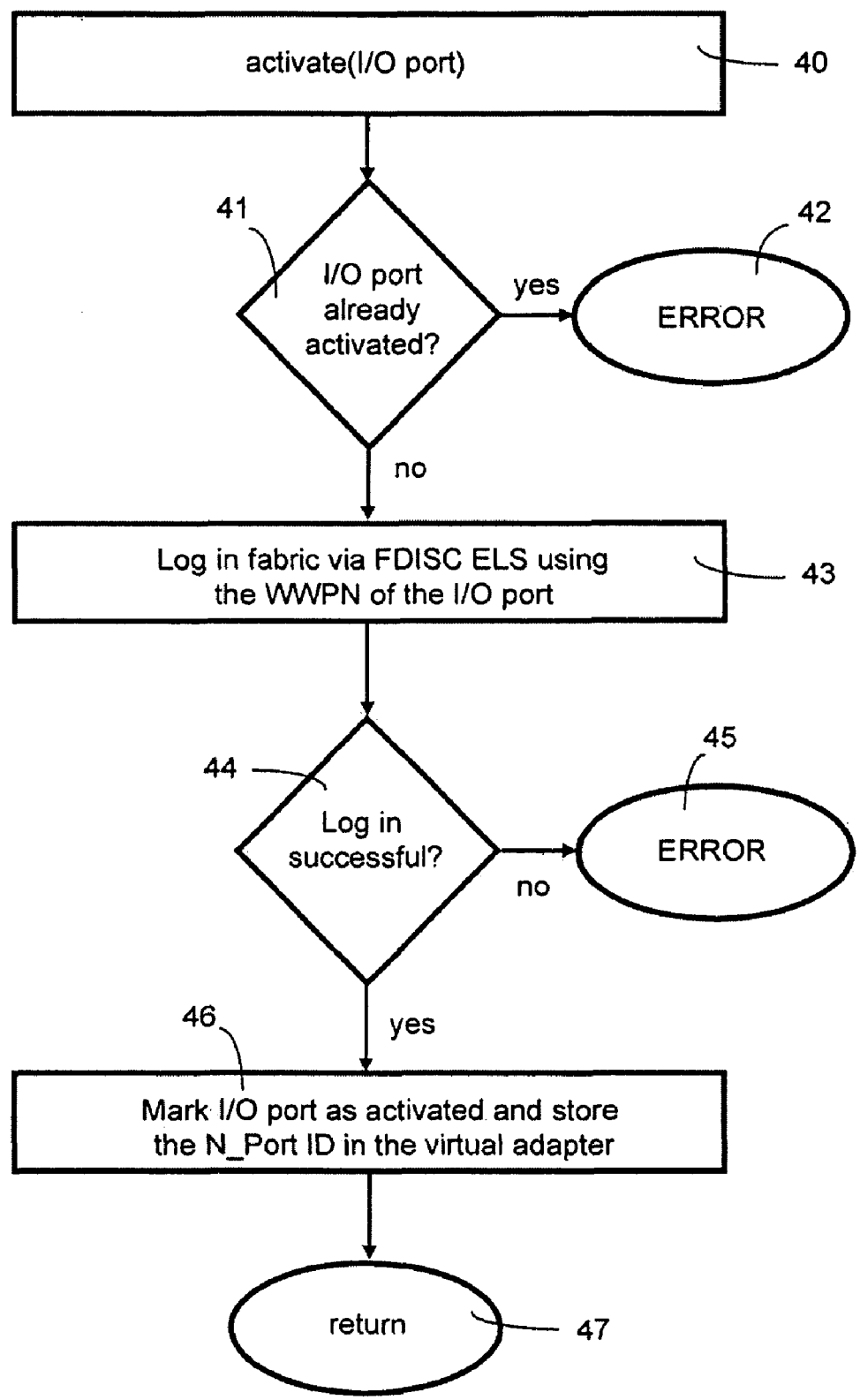
FIG. 4: Is an illustrative flow chart of an embodiment of a method in accordance with the invention.

The steps for the I/O port 32 activation are shown in FIG. 4. The communication unit 31 triggers the activation of the I/O port 32 (step 40). If (step 41) the I/O port 32 is already activated, then (step 42) the AVE 30 presents an error to the communication unit 31. Otherwise the WWPN of the I/O port 32 will be used to log in the fabric 16 using the FDISC ELS command (step 43). If (step 44) the login is not successful, then (step 45) the AVE 30 presents an error to the communication unit. Otherwise the AVE 30 marks the I/O port 32 as activated, stores the N_Port ID provided by the fabric 16 in the virtual adapter (step 46), and returns to the communication unit 31 (step 47).

Figure 5:
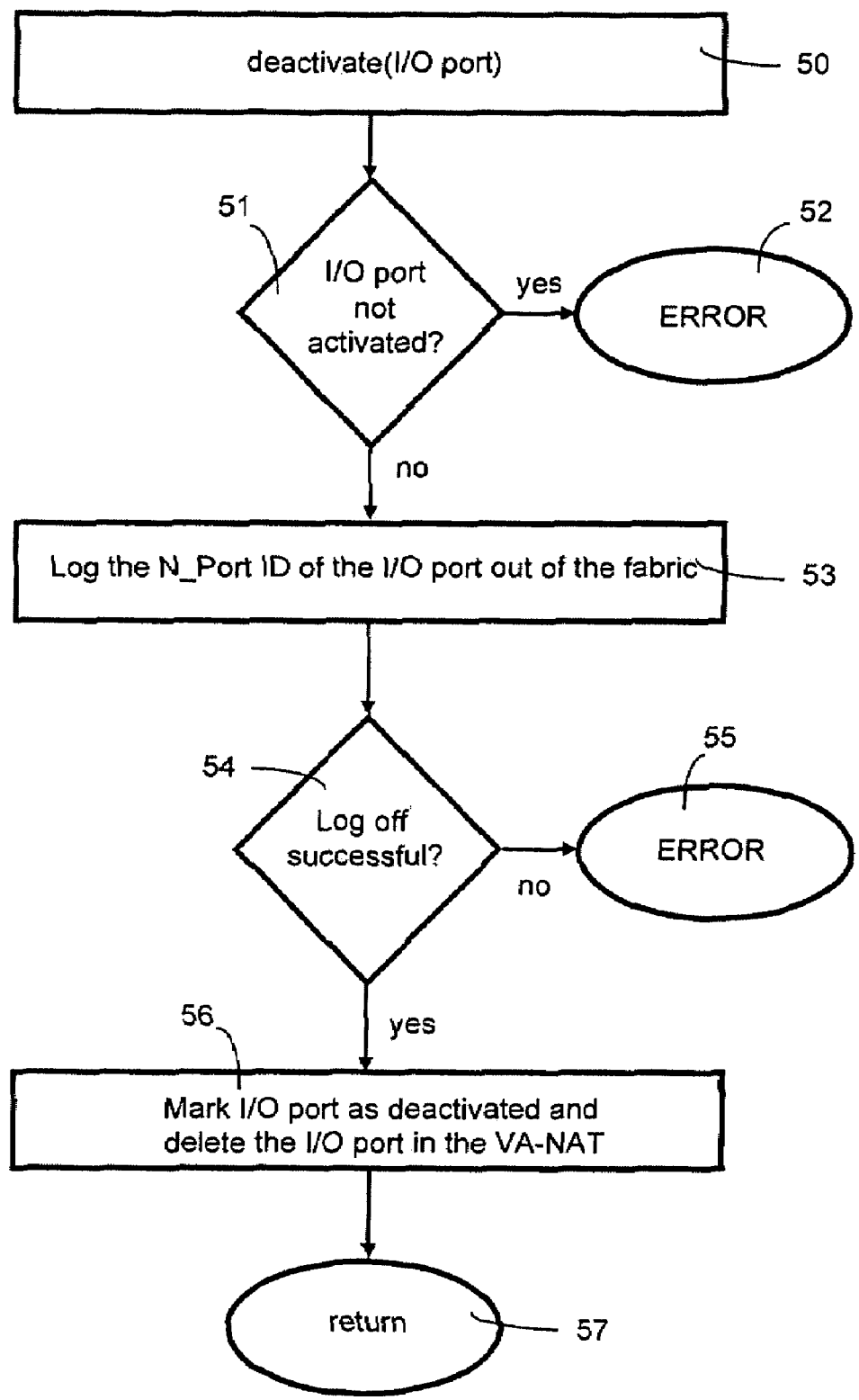
FIG. 5: Is an illustrative flow chart of an embodiment of a method in accordance with the invention.

FIG. 5 shows the steps for the I/O port 32 deactivation. The communication unit 31 triggers the deactivation of an I/O port 32 (step 50). If (step 51) the I/O port 32 is not activated, the AVE presents an error to the communication unit 31 (step 52). Otherwise the N_Port ID associated to the I/O port 32 will be logged out of the fabric 16 (step 53) using well-known methods described in reference 2. If (step 54) the logout is not successful, then the AVE 30 presents an error to the communication unit 31 (step 55). Otherwise (step 56) the I/O port 32 will be marked as deactivated, and the associated N_Port ID entry for the WWPN will be deleted in the virtual adapter. Afterwards the AVE 30 finishes the deactivation successfully (step 57).

I/O ports that have been generated in a configuration step of the hypervisor 20 can be removed from the system configuration. If an I/O port is removed from the system configuration, the corresponding WWPN is added to the pool of WWPNs 34 again and marked as "locked". The VA-NC 33 will not use a WWPN that is marked "locked" for the assignment to a newly created I/O port 32, i.e. I/O ports that are subsequently added to the system configuration.

The locking of a WWPN when its associated I/O port 32 has been removed from the system configuration of the hypervisor 20 has to be done in order to avoid that this WWPN could be assigned again to another I/O port 32 that gets added to the system configuration of the hypervisor 20. This would be the case if access rules are still established in the SAN for this WWPN, for example a LUN mask setting granting this WWPN access to certain devices (LUNs). But often such a re-use of a WWPN with a new I/O port is not intended, as only certain OS instances are meant to use certain resources in the SAN.

Therefore, to recover these locked WWPNs, and to prevent the situations where no WWPN can be assigned to an I/O port because all available WWPNs are either locked or in use, the VA-NC 33 adds an interface to the hypervisor 20 that allows unlocking a WWPN. So for example a system administrator can unlock a WWPN for which it was verified that no unintended access rights are in place, and therefore it is safe to reassign this WWPN to an I/O port 32 that can be assigned to any operating system instance 21a.

In an embodiment of the invention, WWPNs that were associated to I/O ports that have been removed from the system configuration of the hypervisor 20 are added to a least-recently-used list 36 stored in the memory 11 (or on the persistent storage device 14).

This least-recently-used list 36 is implemented as a first-in first-out list. An entry of this list 36 contains a WWPN together with an identifier for the I/O port 32 to which the WWPN was assigned. Should the same I/O port 32 (as indicated by the identifier) be redefined again while the corresponding WWPN is still in the least-recently-used list 36, then the same WWPN will be assigned to that I/O port 32 again. This way there is no need to reconfigure the SAN as would be the case when an I/O port 32 is temporarily removed from the system configuration of the hypervisor 20, and another WWPN would be assigned to the I/O port 32 when the I/O port 32 gets added to the system configuration of the hypervisor 20 again.

The length of the least-recently-used list 36 may be limited such that not all possible WWPNs that fall out of the AV-NAT 35 can be kept in this table. If a WWPN falls out of the least-recently-used list, it will be added to the pool of WWPNs 34 again and still remain marked as "locked". Instead of maintaining the least-recently-used list 36 as a first-in first-out list, various other strategies are possible for the decision to remove an entry from the list 36.

The use of the least-recently-used list 36 may save a considerable amount of the memory 11 for large and dynamically changing system configurations of the hypervisor 20 as all the memory allocated for the special data structures of the virtual adapters associated with the locked WWPNs can be released. Otherwise it would be required to keep the I/O ports and their associated virtual adapters in order to avoid the SAN reconfiguration.

The WWPNs stored in the pool 34 are assigned to the computer system 10 and the pool 34 is stored on the persistent storage device 14. If the WWPNs do not need to be worldwide unique because they will be used in a configuration that is completely isolated from all other SANs, the VA-NC 33 can also use a scheme to generate a WWPN for a new I/O port definition instead of taking it out of the pool 34 of WWPNs. A possible scheme is to use a common prefix that will be combined with an identifier for the I/O port 32.

A scheme can also be used to generate WWPNs that are really unique worldwide. For this scheme a worldwide unique prefix would be assigned to the computer system 10, and this prefix would be combined with the identifier for the I/O port 32 for example. In yet another embodiment, the physical N_Port and its associated WWPN is used in shared mode as described in the U.S. patent application No. 2003/0200247A1, using the access control mechanism as described in the U.S. patent application No. 2004/0025166A1. This can be exploited if the number of OS instances 21 that need to concurrently share a physical N_Port is larger than the number of virtual adapters that can be supported on the physical N_Port. In another embodiment, also one or more virtual adapters with their associated configured WWPNs can be used as shared virtual adapters in the same way.

In one embodiment of the present invention the VA-NC 32 adds an interface to the hypervisor 20 that allows querying for the WWPN and the N_Port ID currently assigned to an I/O port. This can be used by an OS instance 21a for SAN management and administration purposes.

The first login from a physical N_Port 17 to the fabric 16 must always be done using the FLOGI ELS command. In one embodiment, the WWPN assigned to the physical N_Port 17 is used for this FLOGI-type login. Although the FC-FS standard (see reference 1) would allow the logout of the N_Port 17, which did the FLOGI login from the fabric 16 while other fabric 16 logins from virtual adapters associated with the N_Port 17 are still active, it may cause problems when the N_Port 17 is logged in the fabric 16 again. The reason is that the WWPN specified with the FLOGI is used as a permanent port name for the physical N_Port, and remains associated with this N_Port and maintained by the fabric 16 as long as any login for this physical N_Port is still active. Specifically, if the FLOGI login is revoked by a corresponding logout while an FDISC login is still active, and now the WWPN used previously for the FLOGI login is used for another login into the fabric 16, the fabric 16 may see the same WWPN twice, which may cause disturbances to SAN management applications.

Therefore, in an embodiment of the invention the N_Port ID assigned by the fabric 16 for the WWPN of the N_Port 17 used for the FLOGI-type login is not logged out (see step 54) during the deactivation of an I/O port 32 associated to this N_Port ID when additional N_Port IDs for this physical N_Port are still logged in the fabric 16, which means that I/O ports 32 associated to these N_Port IDs are still active.

It is possible that an N_Port can become disconnected from the fabric 16. If this occurs all the FC frames for incomplete exchanges using the N_Port are invalidated and all the N_Port IDs are automatically logged out of the fabric 16. Depending on its type, a disconnection is indicated by the FC adapter 15 by either sending a FC frame indicating unsolicited status to the AVE 30 or by storing a special value in a register of the FC adapter 15 that is accessible for the AVE 30. The AVE 30 informs an affected OS instance 21b that its virtual adapters have been logged out. For each N_Port ID that was logged out as a result of the disconnection, the affected communication units 31 need to deactivate their affected I/O ports 32 and activate them again.

In order to minimize the impact of an N_Port disconnection to application programs in an OS instance 21b affected by that disconnection, I/O ports 32 can be prioritized for re-activation. A simple prioritisation solution is that the AVE 30 uses a priority list of I/O ports in the memory 11 that were active before. For every I/O port 32 activation, the AVE 30 searches this priority list and if it finds the I/O port in the priority list (that is, the activation is a re-activation of a disconnected I/O port), the activation continues immediately. Otherwise the AVE 30 waits a certain amount of time before it continues the activation so as to not consume an N_Port ID before a previously-active I/O port can be re-activated. An entry in the priority list is deleted when it is found during I/O port activation, and it is removed after some expiration time.

Further, it is possible to define characteristics for a virtual adapter. For example, it is possible to define certain performance characteristics in order to balance between the virtual adapters that share the same physical N_Port 17 based on the performance needs of each OS instance 21a using the virtual adapters; e.g. a "high bandwidth" could define the use of bigger memory buffers by the AVE 30 in order to increase the bandwidth for a virtual adapter; "low bandwidth" could define the use of small memory buffers by the AVE 30 in order to decrease the bandwidth for a virtual adapter.

The separate storage device 14 does not need to be directly attached to the computer system 10. It can also be attached to another computer system that provides indirect access to this storage device 14 via a network service for example.

This invention is preferably implemented as software, a sequence of machine-readable instructions, especially as so-called firmware executing on one or more hardware machines that controls and monitors these hardware machines and is often used to implement well-defined interfaces to the hardware, which other programs (especially operating systems) can use.

While a particular embodiment has been shown and described, various modifications of the present invention will be apparent to those skilled in the art.

The invention claimed is:

1. A computer program product, tangibly embodied on a computer readable medium, for managing virtual instances of a physical port attached to a network, where each instance is assigned a Worldwide Port Name (WWPN) and where the network assigns each instance a port identifier, whereby the network provides a separate logical connection for said new port identifier which is logged in with said network and removes said separate logical connection path for said new port identifier when said new port identifier is logged off from the network, the computer program product including instructions for causing a computer to execute a method, comprising:

assigning the WWPN from a pool of WWPNs and removing said WWPN from said pool of WWPNs;

storing the WWPN in a table of WWPNs on a persistent storage device that is not accessed using said network when said new port identifier is logged in said network;

deleting said WWPN from said table when said new port identifier is logged off from said network, and;

returning said WWPN to said pool of WWPNs.;

wherein said WWPN can be marked as either "unlocked" or "locked" in said pool of WWPNs, said pool of WWPNs being marked "locked" are not be used;

marking said WWPN as "locked" when said new port identifier is removed;

activating a virtual instance for a physical port when said new port identifier was assigned by said network;

deactivating said virtual instance, storing the WWPN of said new port identifier together with a unique identifier for said virtual instance in a least-recently-used (LRU) list in the memory when said new port identifier is removed by said network;

searching for said unique identifier of said virtual instance in said LRU list when said virtual instance is requested to be activated again;

using said WWPN instead of a WWPN from said pool of WWPNs if said unique identifier for said virtual instance is found in said list;

verifying that no unintended access rights granting access to certain resources are in place for said WWPN;

in response to verifying that no unintended access rights are in place for said WWPN, allowing said WWPN to be reassigned to a different port identifier;

defining a set of characteristics;

choosing a characteristic from said set of characteristics and assigning the characteristic to said virtual instance;

selecting an operating system instance based on said chosen characteristic; and assigning said operating system instance to said virtual instance based on said characteristic.

2. The computer program product of claim 1, wherein said computer program is a hypervisor.

3. A computer system for managing virtual instances of a physical port attached to a network, where each instance is assigned a Worldwide Port Name (WWPN) and where the network assigns each instance a port identifier, whereby the network provides a separate logical connection for said new port identifier which is logged in with said network and removes said separate logical connection path for said new port identifier when said new port identifier is logged off from the network, the computer system comprising:

a server computer, said server computer comprising a network adapter, wherein said server computer executes a hypervisor component for providing for a number of operating system instances, a processor, wherein the processor is responsive to computer-executable instructions hypervisor component and operative to:

assign the WWPN from a pool of WWPNs and removing said WWPN from said pool of WWPNs;

store the WWPN in a table of WWPNs on a persistent storage device that is not accessed using said network when said new port identifier is logged in said network;

delete said WWPN from said table when said new port identifier is logged off from said network, and;

return said WWPN to said pool of WWPNs.;

wherein said WWPN can be marked as either "unlocked" or "locked" in said pool of WWPNs, said pool of WWPNs being marked "locked" are not be used;

marke said WWPN as "locked" when said new port identifier is removed;

activate a virtual instance for a physical port when said new port identifier was assigned by said network;

deactivate said virtual instance, storing the WWPN of said new port identifier together with a unique identifier for said virtual instance in a least-recently-used (LRU) list in the memory when said new port identifier is removed by said network;

search for said unique identifier of said virtual instance in said LRU list when said virtual instance is requested to be activated again;

use said WWPN instead of a WWPN from said pool of WWPNs if said unique identifier for said virtual instance is found in said list;

verify that no unintended access rights granting access to certain resources are in place for said WWPN;

in response to verifying that no unintended access rights are in place for said WWPN, allow said WWPN to be reassigned to a different port identifier;

define a set of characteristics;

choose a characteristic from said set of characteristics and assigning the characteristic to said virtual instance;

select an operating system instance based on said chosen characteristic; and assign said operating system instance to said virtual instance based on said characteristic.

4. The computer system of claim 3, wherein said OS instances access computer-system interfaces through said hypervisor, said hypervisor comprising an adapter virtualisation engine, and the management of said pool of WWPNs and said table are controlled by a virtual adapter name controller component of said hypervisor.

5. The computer system of claim 4, where said pool of WWPNs and said table of WWPNs can be queried by any of said operating system instances.

6. The computer system of claim 5, where the WWPNs in said pool of WWPNs can be marked as "unlocked" by manual or automatic means after having been "locked".

7. The computer system of claim 4, where the WWPNs in said pool of WWPNs cannot be assigned by said operating system instances.

8. The computer system of claim 4, where said storage device is not accessible by said operating system instances.

* * * * *